(12) United States Patent
Weinberg

(10) Patent No.: US 7,475,633 B2
(45) Date of Patent: Jan. 13, 2009

(54) BOTTLE CRUSHING DEVICE

(76) Inventor: Morgan Weinberg, 602 N. Jordan St. #104, Alexandria, VA (US) 22304

( * ) Notice: Subject to any disclaimer, the term of this patent is extended or adjusted under 35 U.S.C. 154(b) by 0 days.

(21) Appl. No.: 11/984,238

(22) Filed: Nov. 15, 2007

(65) Prior Publication Data

US 2008/0115678 A1    May 22, 2008

Related U.S. Application Data

(60) Provisional application No. 60/859,963, filed on Nov. 20, 2006.

(51) Int. Cl.
*B30B 1/20* (2006.01)
*B30B 1/22* (2006.01)

(52) U.S. Cl. .................. 100/289; 100/226; 100/245; 100/902; 222/95; 222/105; 222/386

(58) Field of Classification Search ............... 100/214, 100/215, 226, 227, 229 A, 239, 240, 245, 100/289, 295, 902; 222/95, 105, 107, 386, 222/390, 412, 413; 215/11.1, 11.3
See application file for complete search history.

(56) References Cited

U.S. PATENT DOCUMENTS

| | | | | |
|---|---|---|---|---|
| 3,815,787 A | * | 6/1974 | Spies | 222/95 |
| 3,847,304 A | * | 11/1974 | Cohen | 222/105 |
| 4,339,046 A | * | 7/1982 | Coen | 215/11.5 |
| 5,238,150 A | * | 8/1993 | Williams | 222/95 |
| 5,356,016 A | * | 10/1994 | Wiedemann | 215/11.3 |

* cited by examiner

*Primary Examiner*—Jimmy T Nguyen
(74) *Attorney, Agent, or Firm*—Maier & Maier, PLLC

(57) ABSTRACT

An exemplary method, apparatus and system of crushing a bottle may include a barrel for surrounding a bottle. The barrel may have a main body with a threaded outer surface. A plate may be slidably engaged with an inner surface of the barrel at a first end of the barrel. A nut may be operably engaged with the threads on the outer surface of the barrel. A tab portion may be integral with the plate and the tab portion engaged the nut. A cap may be repeatably attachable to an end of the barrel opposite the plate. Movement of the nut may facilitate movement of the plate and moving the plate in the direction of the lid may crush a bottle within the barrel.

13 Claims, 12 Drawing Sheets

BOTTLE CRUSHING DEVICE

This application claims priority under 35 U.S.C. 119 (e) of U.S. Provisional Application Ser. No. 60/859,963, filed Nov. 20, 2006, the entire contents of which are hereby incorporated by reference in their entirety.

BACKGROUND

Carbonated beverages are produced and sold in various flavors and are marketed in various sized bottles and containers. Generally, larger quantities of carbonated beverages are sold in plastic 2 or 3-liter bottles. These bottles are meant to store and distribute multiple servings of a carbonated beverage over time: hours, days or even weeks. It is often less expensive for a consumer to purchase these larger beverage bottles than the smaller bottles or cans.

In a carbonated beverage, $CO_2$ molecules are constantly coming out of solution and evaporating into the atmosphere above, and vice versa, impinging upon the surface and re-entering solution. The rate at which molecules leave solution is governed by the fluid temperature, and the rate at which molecules enter solution is a function of the partial pressure of the dissolved gas above the fluid, which in this case is $CO_2$. At a certain partial pressure, $CO_2$ molecules in the atmosphere may enter at a rate equivalent to the rate of evaporation, leaving the net concentration in stasis.

The presence of other gas molecules, specifically those that principally comprise air ($N_2$ and $O_2$) may have no effect on the $CO_2$ evaporation rate. $N_2$ and $O_2$ molecules may not intercept escaping $CO_2$ molecules and deflect them back into the liquid. The Ideal Gas Law teaches that the space between individual gas molecules (at other than extreme pressures) is so vast, relatively speaking, that intra-gas interactions can be ignored, which is the underlying principle of Dalton's Law of partial pressures. Dalton's Law states that the total pressure of a gas mixture is the sum of the partial pressures of each constituent gas.

Two other laws that govern dissolved gases are Le Chatlier's principle and Henry's Law. Le Chatlier's principle teaches that for a given partial pressure, lowering the temperature of the liquid will tend to increase the percentage of dissolved gas therein, and Henry's Law instructs that the solubility of a gas in a liquid is a linear function of the partial pressure of that gas above that fluid.

Typically, carbonated beverage bottlers may add about 3.7 volumes of $CO_2$ per volume of beverage. At a temperature of about 72° F., a $CO_2$ partial pressure of approximately 52 psig may be required to maintain 3.7 volumes of $CO_2$ in equilibrium. At the typical refrigerator temperature of 40° F., a much lower pressure of about 24 psig may be required to maintain equilibrium, demonstrating the degree to which temperature governs $CO_2$ solubility. It can be derived that it may require approximately 148,571 psig of air to develop a $CO_2$ partial pressure of about 52 psig.

SUMMARY

An exemplary embodiment of a bottle crushing apparatus may include a barrel for surrounding a bottle. The barrel may have a main body with a threaded outer surface. A plate may be slidably engaged with an inner surface of the barrel at a first end of the barrel. A nut may be operably engaged with the threads on the outer surface of the barrel. A tab portion may be integral with the plate and the tab may be mounted on the nut and a cap may be repeatably attachable to an end of the barrel opposite the plate.

An exemplary embodiment of a bottle crushing system may include a bottle made of a malleable material. The bottle may have an opening and a lid that may be repeatably sealable to the opening. The exemplary embodiment of a bottle crushing system may also include a barrel for surrounding the bottle. The barrel may include a main body with a threaded outer surface. A plate may be slidably engaged with an inner surface of the barrel at a first end of the barrel. A nut may be operably engaged with the threads on the outer surface of the barrel. A tab portion may be integral with the plate and mounted on the nut. A cap may be repeatably attachable to an end of the barrel opposite the plate.

An exemplary embodiment of a method of crushing a bottle may include placing a bottle on a plate within a barrel through an opening in the barrel. A cap may be sealed over the opening of the barrel with the bottle inside the barrel. The plate may be moved in the direction of the cap of the barrel and the bottle may be crushed as the plate is moved in the direction of the cap.

BRIEF DESCRIPTION OF THE DRAWINGS

Advantages of embodiments of the exemplary bottle crushing device will be apparent from the following detailed description of the exemplary embodiments thereof, which description should be considered in conjunction with the accompanying drawings in which like numerals indicate like elements, in which.

DETAILED DESCRIPTION

Aspects of the exemplary bottle crushing device are disclosed in the following description and related drawings directed to specific embodiments of the exemplary bottle crushing device. Alternate embodiments may be devised without departing from the spirit or the scope of the exemplary bottle crushing device. Additionally, well-known elements of exemplary embodiments of the exemplary bottle crushing device will not be described in detail or will be omitted so as not to obscure the relevant details of the exemplary bottle crushing device. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the exemplary bottle crushing device include the discussed feature, advantage or mode of operation.

Figure 1:
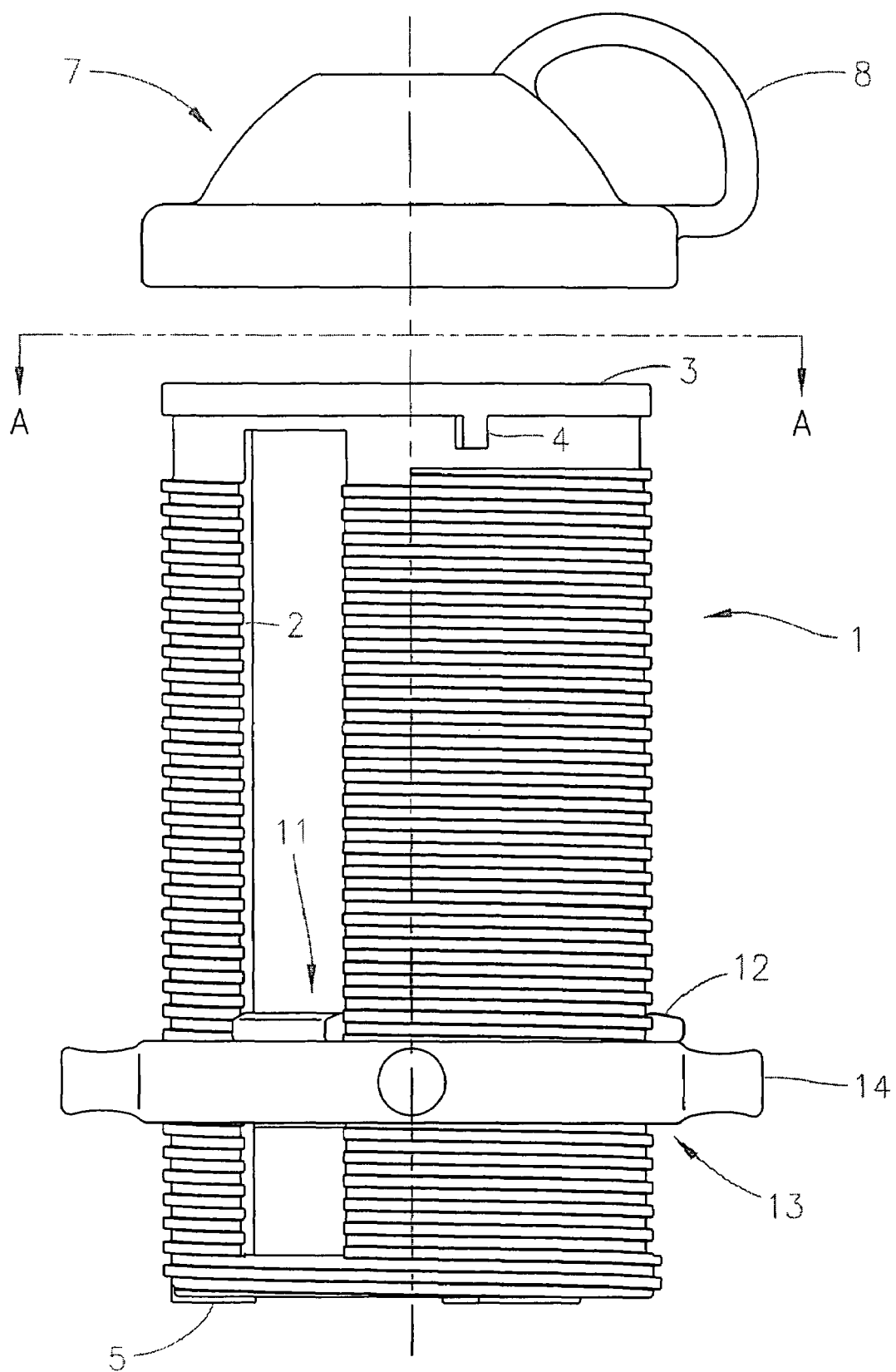
FIG. 1 is an exemplary side view of an exemplary embodiment of a bottle crushing apparatus.
Figure 2:
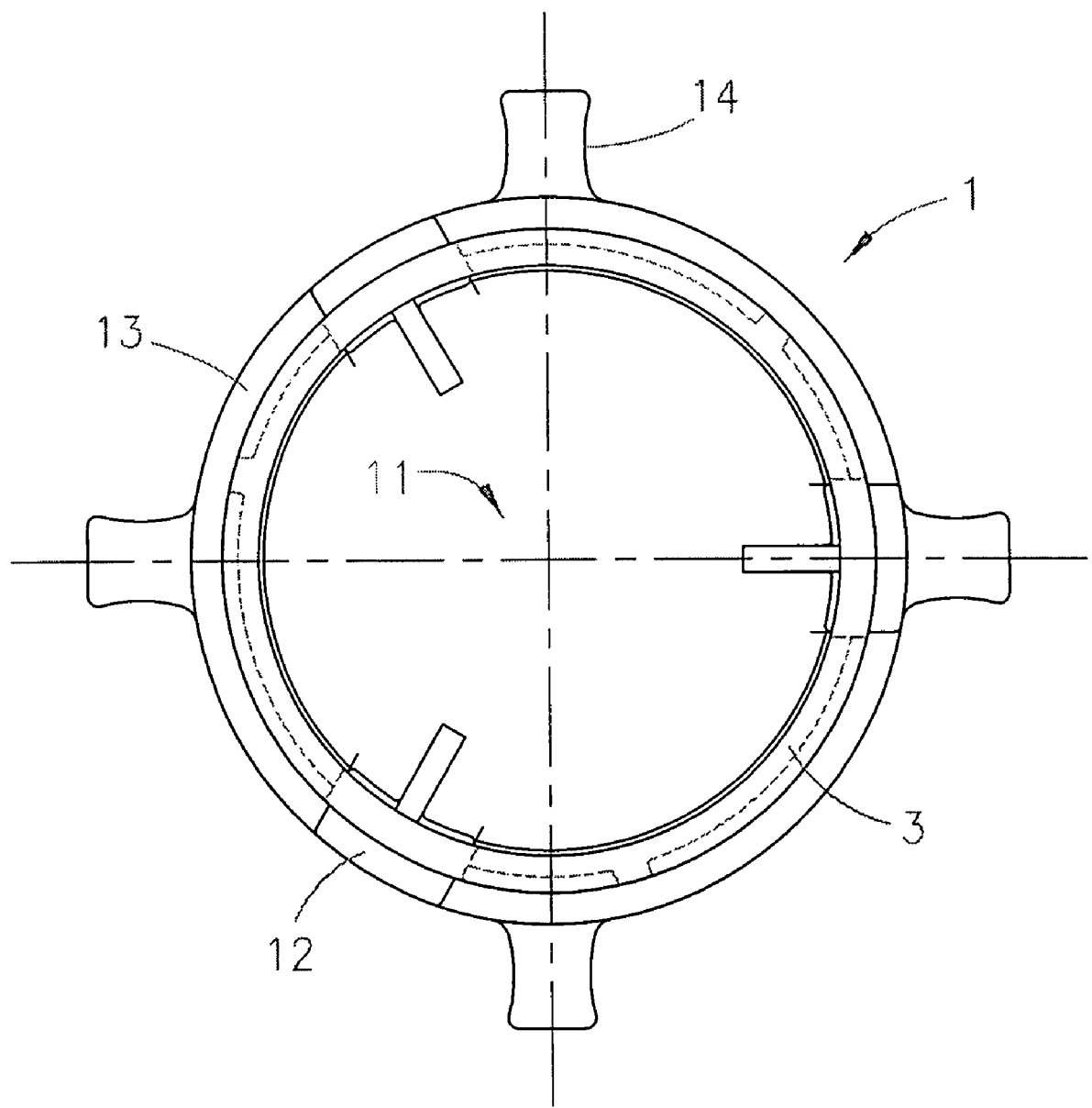
FIG. 2 is an exemplary top view of an exemplary embodiment of a bottle crushing apparatus drawn at line A-A of FIG. 1.
Figure 3:
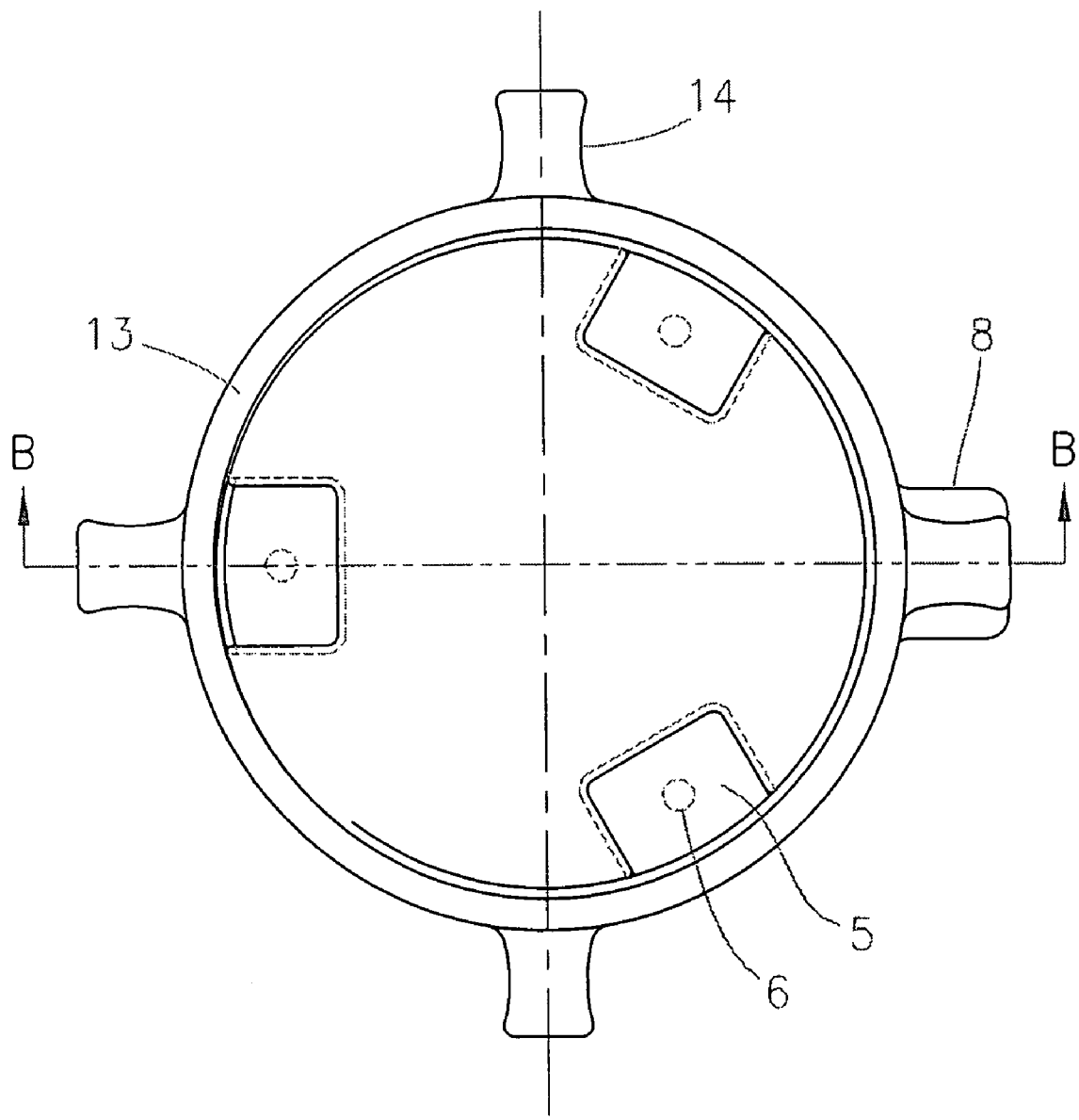
FIG. 3 is an exemplary bottom view of an exemplary embodiment of a bottle crushing apparatus.
Figure 4:
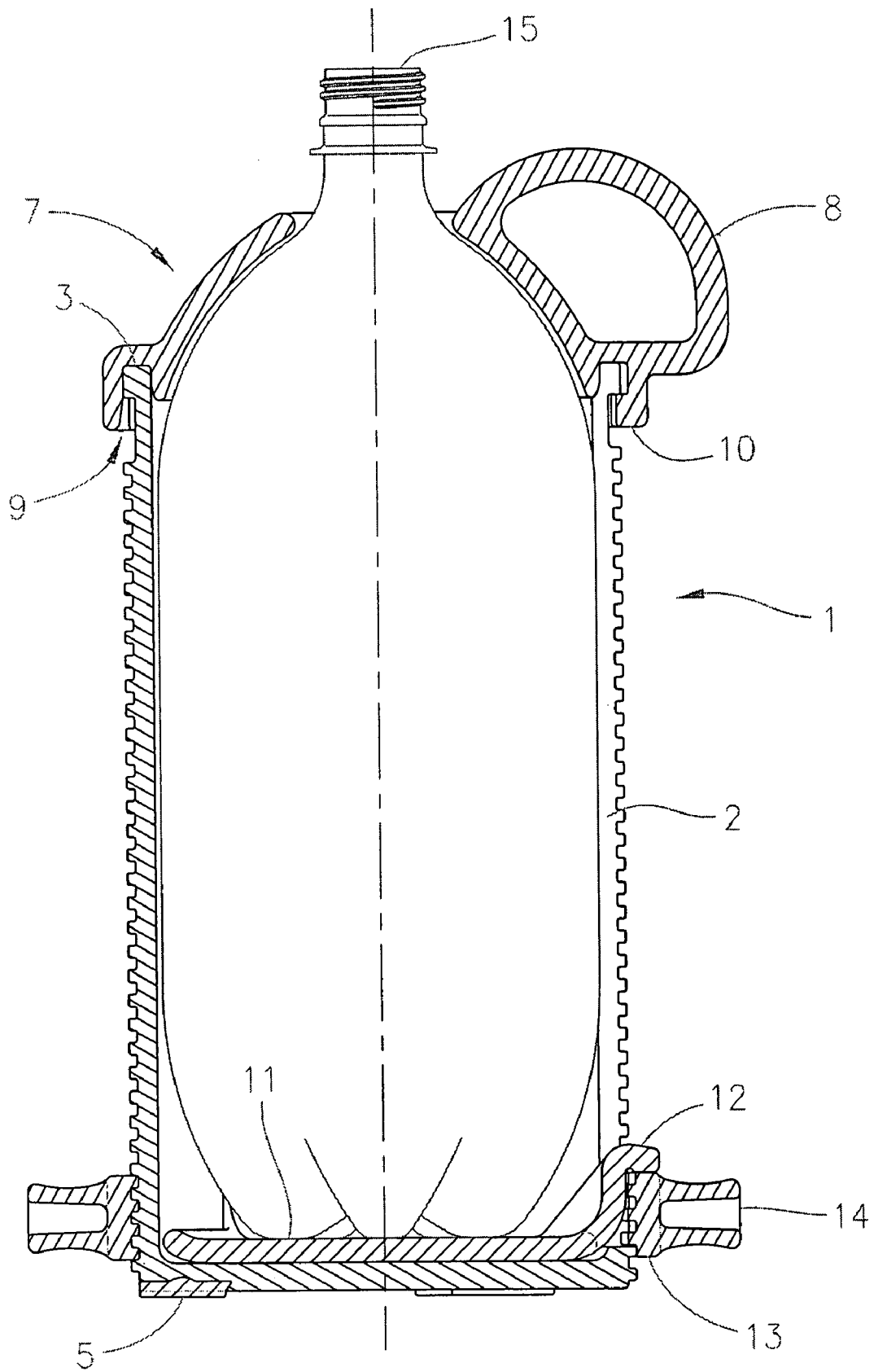
FIG. 4 is an exemplary cross-sectional view of an exemplary bottle crushing apparatus drawn at line B-B of FIG. 3, with an uncrushed bottle.
Figure 5:
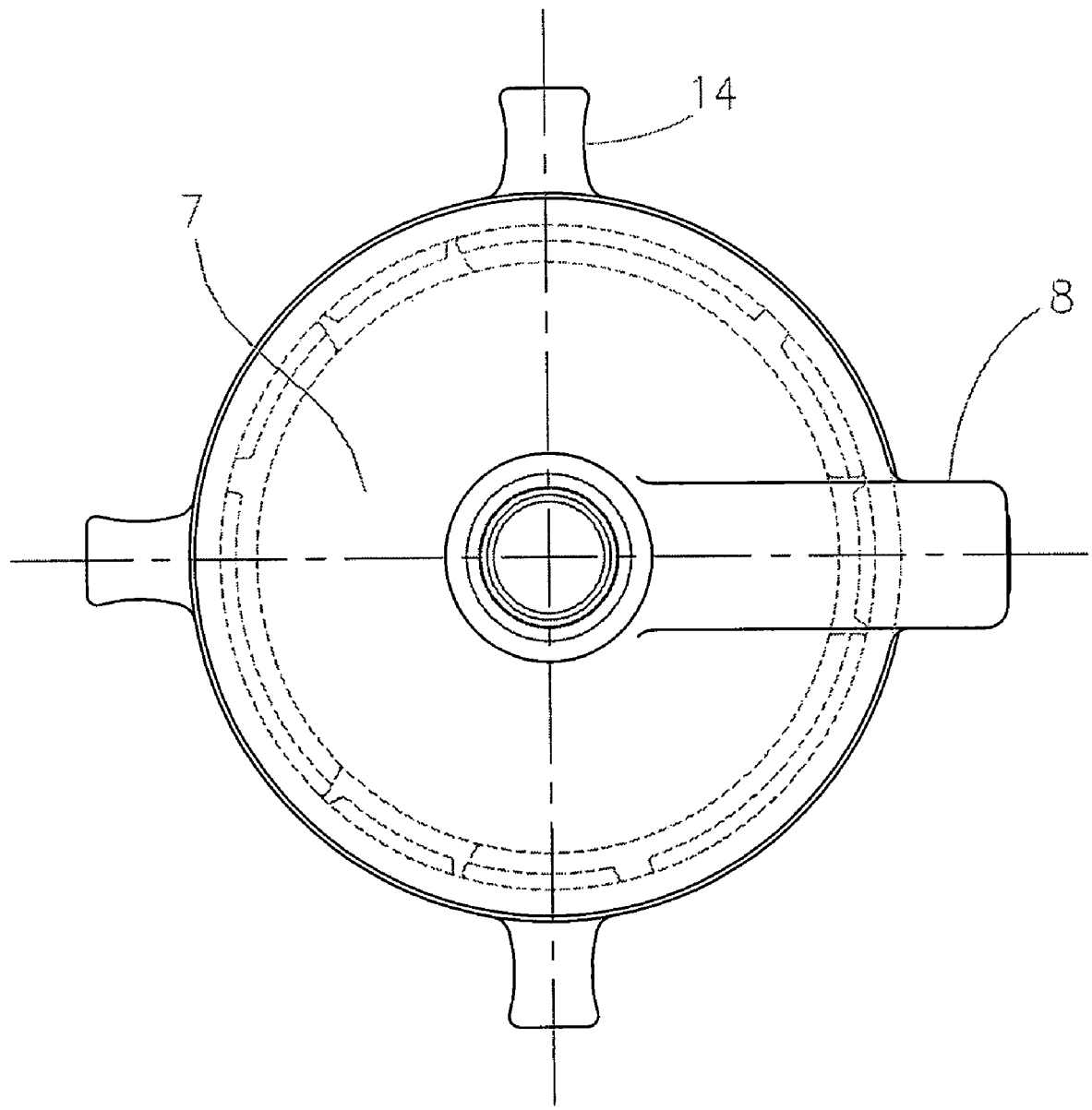
FIG. 5 is an exemplary top view of an exemplary embodiment of a bottle crushing apparatus.
Figure 14:
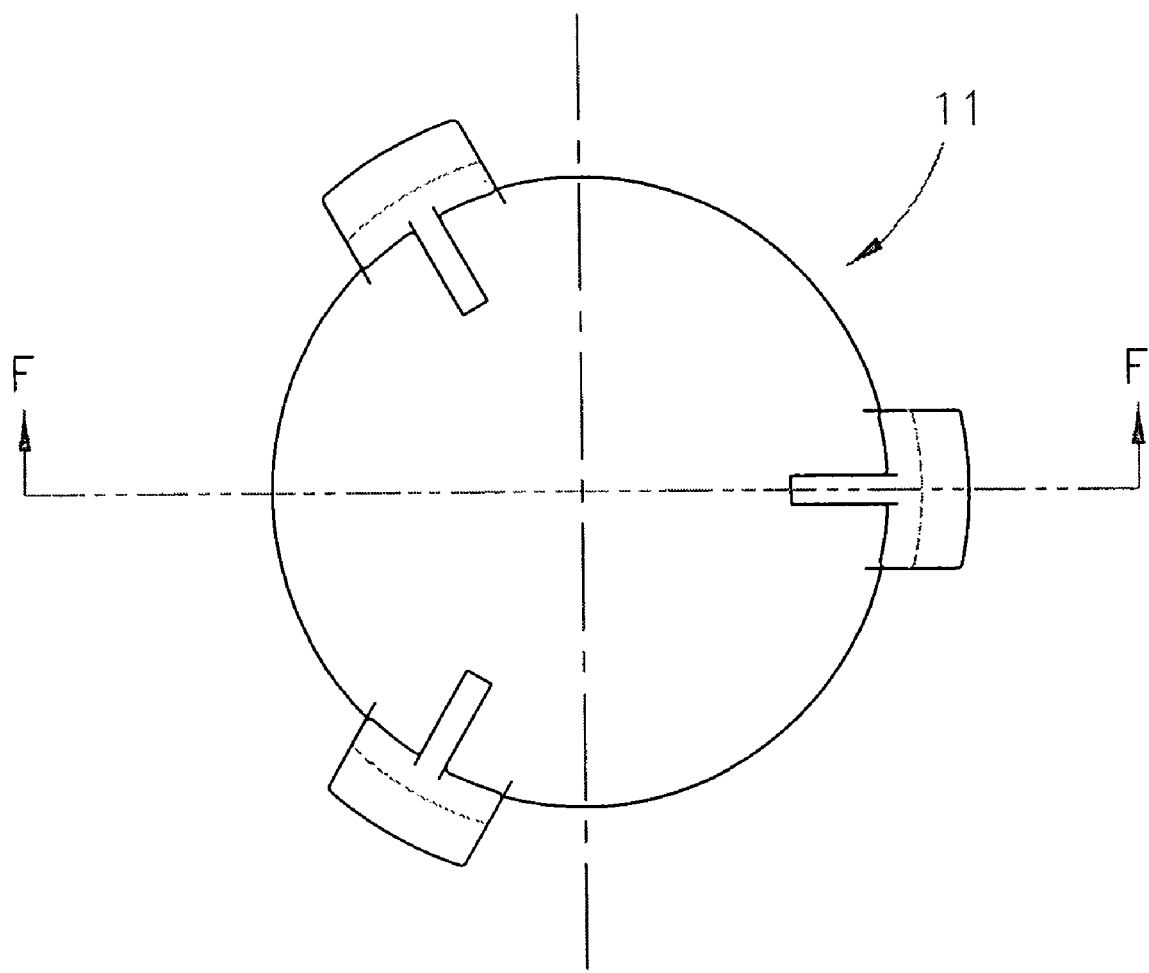
FIG. 14 is an exemplary top view of an exemplary embodiment of a pusher plate of an exemplary embodiment of a bottle crushing apparatus.
Figure 15:
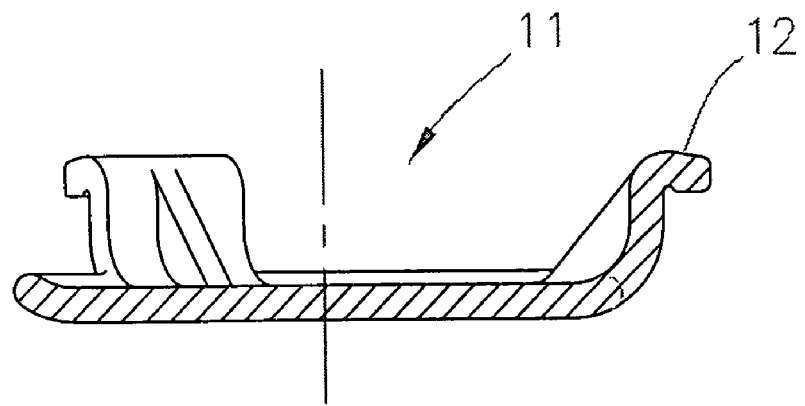
FIG. 15 is an exemplary cross-sectional view an exemplary embodiment of a pusher plate of an exemplary embodiment of a bottle crushing apparatus drawn at line F-F of FIG. 14.

Referring to FIGS. 1-6, an exemplary embodiment of a bottle crushing device may include a barrel 1 and a cap 7 that can be rotatably attached to barrel 1 or may be attached through any other desired repeatable attachment mechanism. A pusher plate 11, as seen in FIGS. 14 and 15, may be slidably engaged with an inner surface of barrel 1 and a thrust nut 13 can be threadably engaged to an outer surface of barrel 1. As shown in FIG. 4, barrel 1 may contain a plastic bottle 15, which may include a standard 2-liter beverage bottle or any other desired bottle size, that can be inserted in the barrel 1 so as to crush the bottle 15.

In an exemplary embodiment, thrust nut 13 may engage the tabs 12 of pusher plate 11, shown in FIGS. 14 and 15. These tabs may slide in corresponding channels 2. There may be three tabs 12, or any other desired number of tabs 12. The number of channels may correspond to the number of tabs 12, but may also include a lesser or greater number of channels 2 than tabs 12. As the thrust nut 13 turns it may engage the pusher plate 11 through contact with tabs 12 via channels 2. The interaction between channels 2 and tabs 12 may allow pusher plate 11 to stay rotatably fixed, yet slidable along the axis of barrel 1 according to the rotation of thrust nut 13. The channels 2 may be closed at both or either end of barrel 1 to increase the rigidity of barrel 1 and channels 2. Pusher plate 11 may be inserted sideways through one of channels 2, allowing pusher plate 11 to be positioned inside barrel 1.

Figure 7:
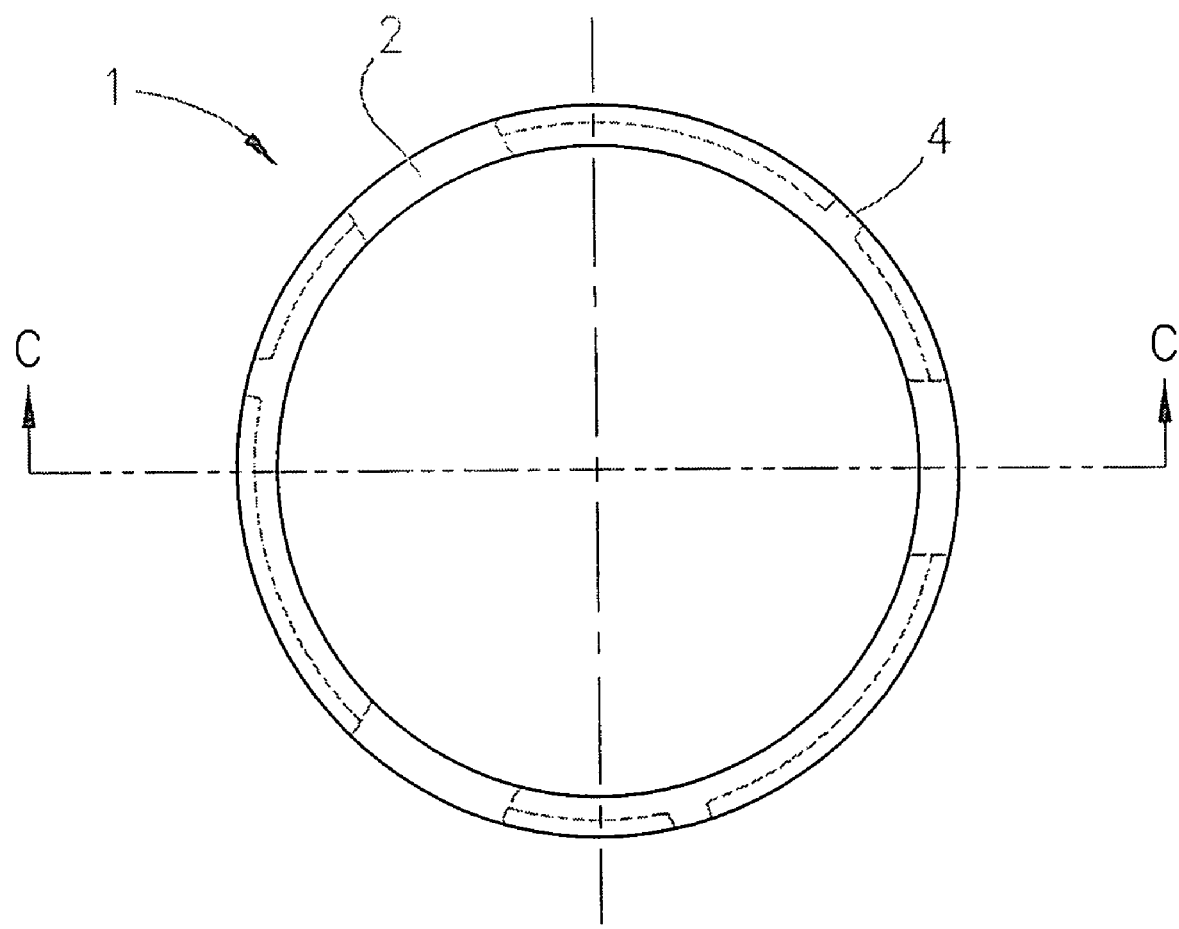
FIG. 7 is an exemplary top view of an exemplary embodiment of a barrel of an exemplary embodiment of a bottle crushing apparatus.
Figure 8:
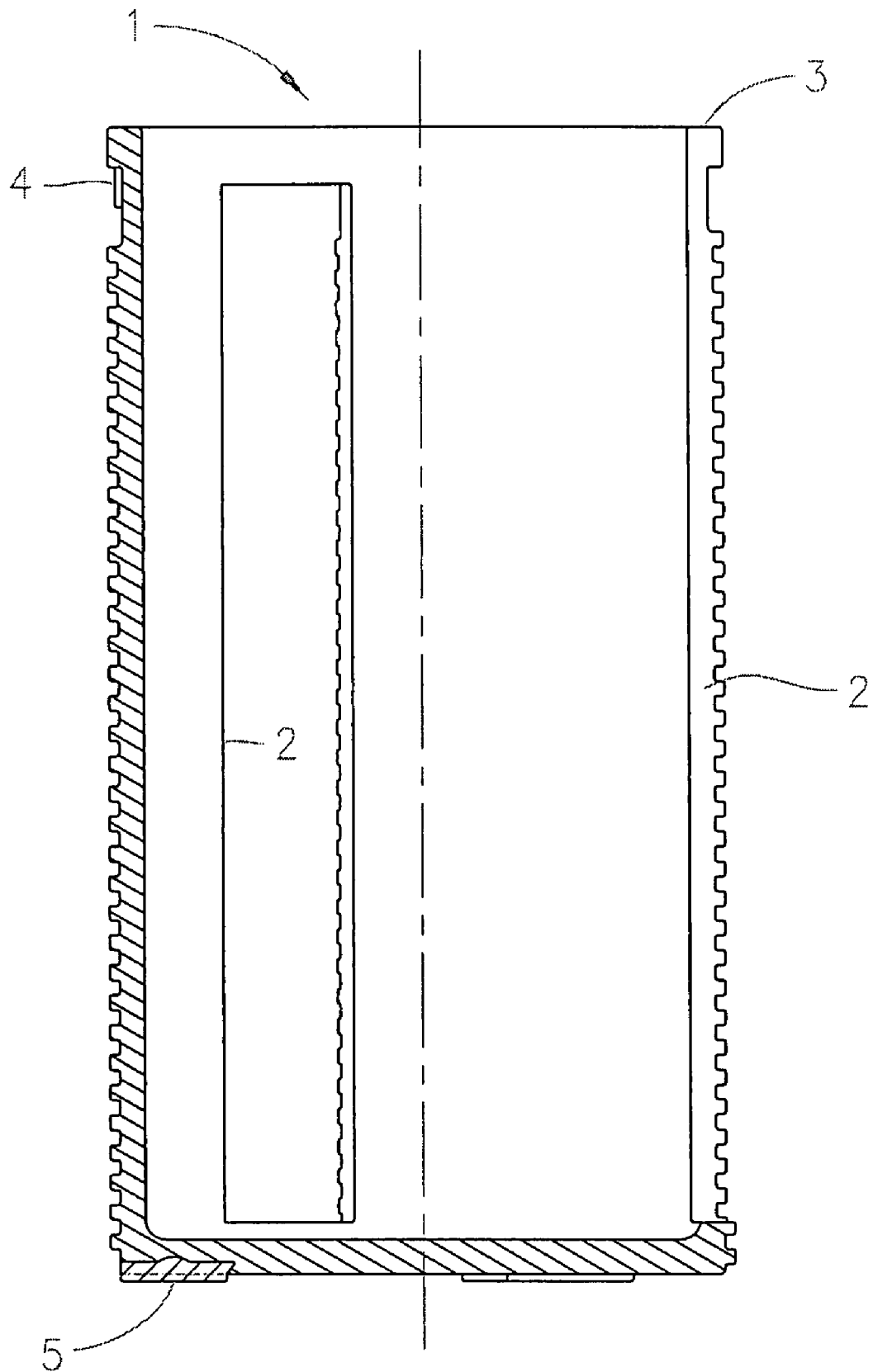
FIG. 8 is an exemplary cross-sectional view of an exemplary embodiment of a barrel of an exemplary embodiment of a bottle crushing apparatus drawn at line C-C of FIG. 7.
Figure 10:
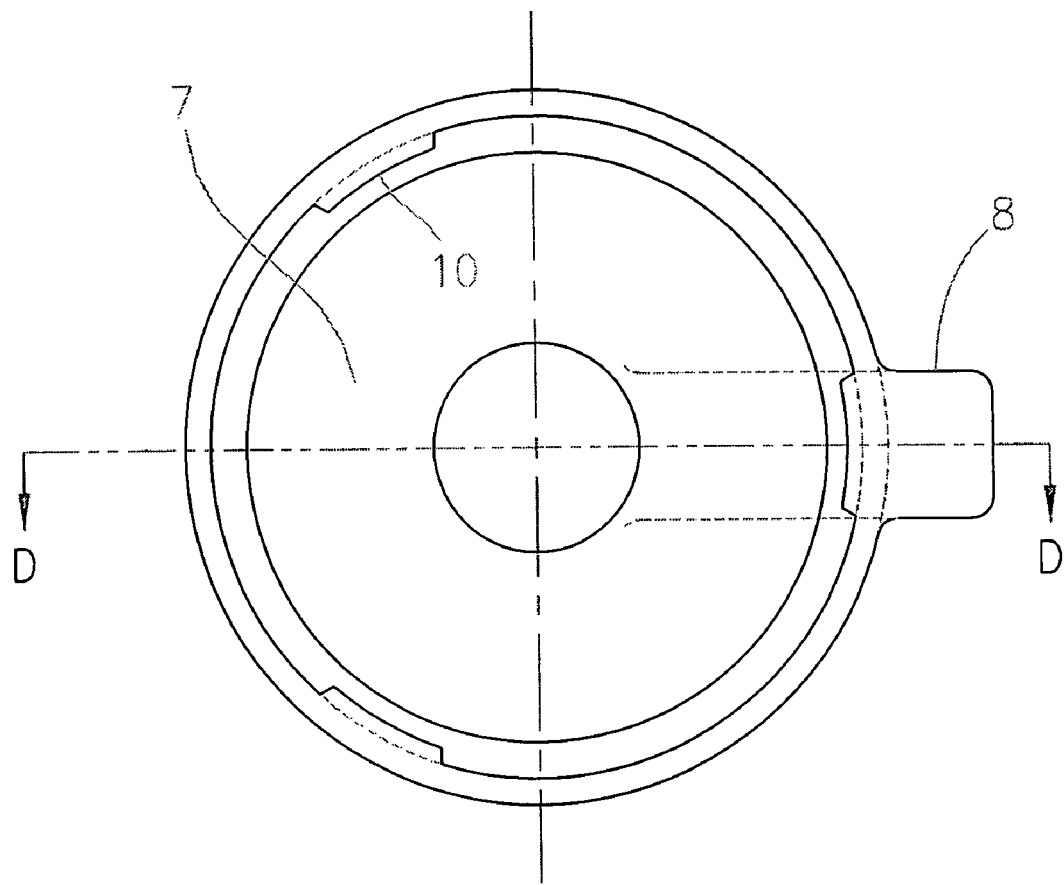
FIG. 10 is an exemplary bottom view of an exemplary embodiment of a cap of an exemplary embodiment of a bottle crushing apparatus.
Figure 11:
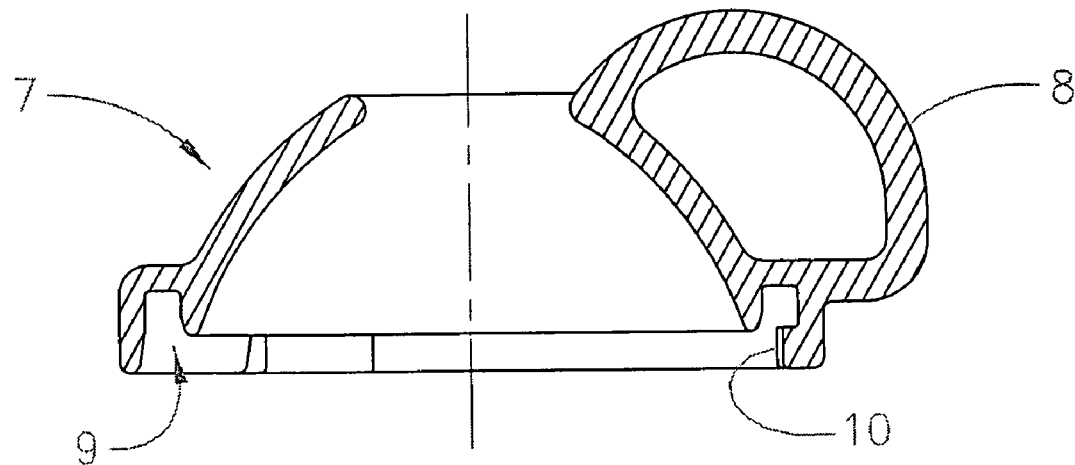
FIG. 11 is an exemplary cross-sectional view of an exemplary embodiment of a cap of an exemplary embodiment of a bottle crushing apparatus drawn at line D-D of FIG. 10.
Figure 12:
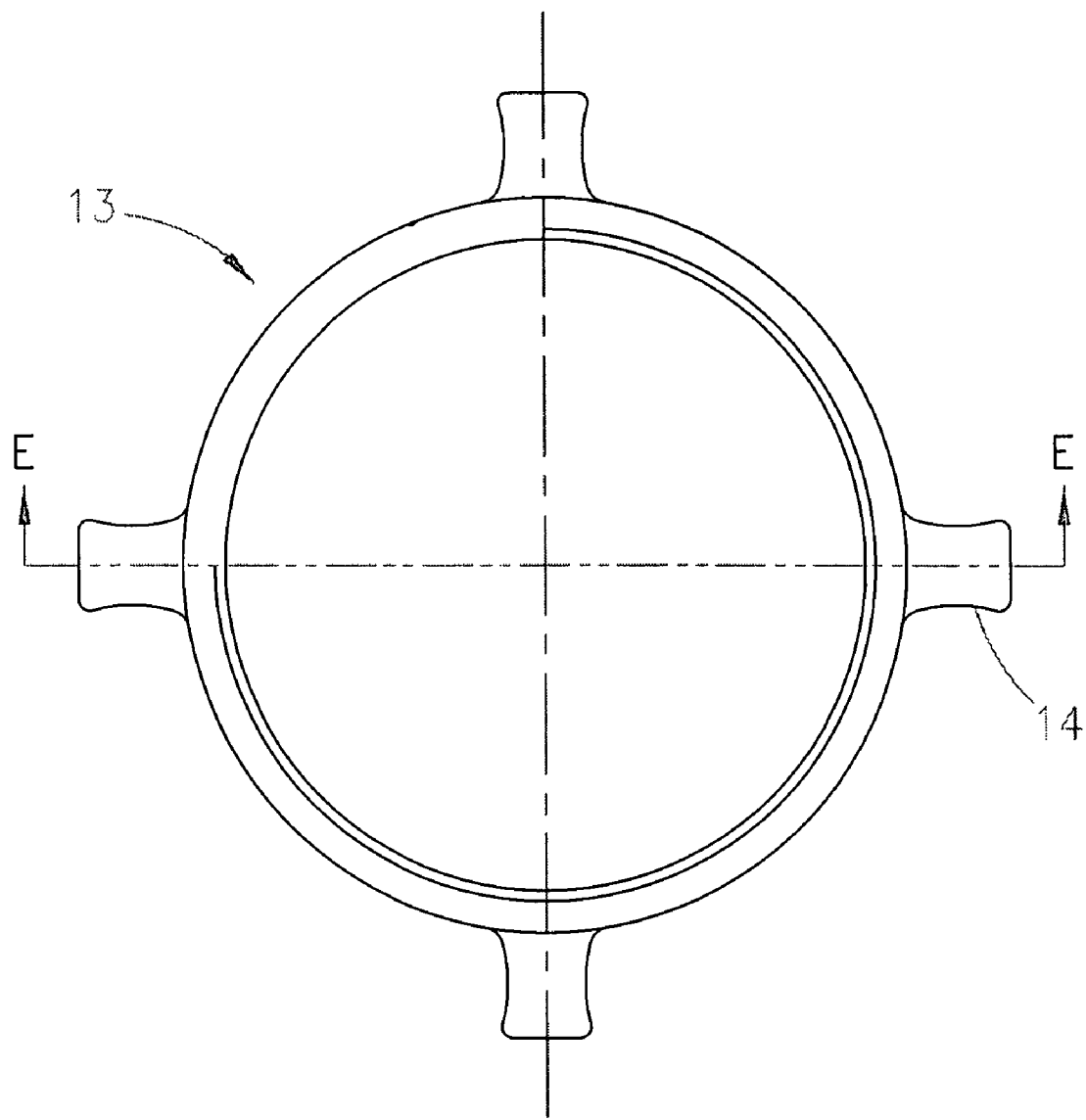
FIG. 12 is an exemplary top view of an exemplary embodiment of a thrust nut of an exemplary embodiment of a bottle crushing apparatus.
Figure 13:
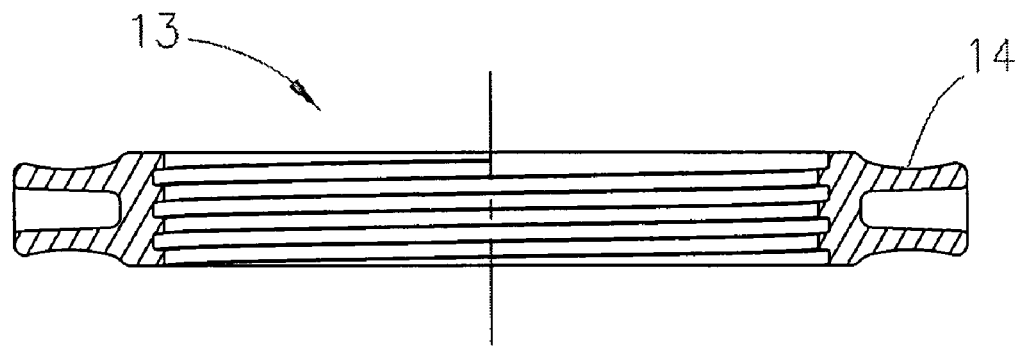
FIG. 13 is an exemplary cross-sectional view of an exemplary embodiment of a thrust nut of an exemplary embodiment of a bottle crushing apparatus drawn at line E-E of FIG. 12.

In another exemplary embodiment thrust nut 13 may be rotated, for example counter-clockwise, until pusher plate 11, is lowered to the bottom of the barrel, as shown in FIG. 4. An unopened bottle 15 may be inserted into barrel 1. Once bottle 15 is inserted into barrel 1, cap 7 may be rotated such that handle 8 is aligned with any of the three channels 2 in barrel 1, shown in FIGS. 7 and 8. Cap 7, illustrated in FIGS. 10 and 11, may be attached to barrel 1 by pushing cap 7 downward such that groove 9 fully receives collar 3 of barrel 1. Groove 9 may be tapered to aide in facilitating a facile insertion of the collar 3 into the groove 9.

In an exemplary embodiment cap 7 may be rotated, for example counter-clockwise, allowing cap tabs 10 of cap 7 to slide underneath collar 3. There are may be a corresponding number of cap tabs 10 and channels 2 of barrel 1, as may be seen in FIG. 2. The number of cap tabs 10 may vary and may include any number of desired cap tabs 10. Cap 7 may be rotated until cap tabs 10 contact corresponding stops 4 underneath collar 3. Handle 8 of cap 7 can be pulled by the user to assist in the rotation and affixing of cap 7 to barrel 1.

Bottle 15 may be placed inside barrel 1 and the cap 7 may be affixed to the barrel 1, allowing a user to remove the lid (not shown) of the bottle and dispense its contents. Upon completion of the dispensing, the user may reattach the lid, however, the user may leave the lid unsealed, allowing air or gas to pass between the inside and outside of the bottle 15. The user may grasp handle 8 and simultaneously grasp one of the knobs 14 attached to thrust nut 13, as a means of rotating the thrust nut. The user may rotate the thrust nut 13 along threads on barrel 1, advancing the thrust nut 13 and correspondingly the pusher plate 11, axially upwards the cap 7.

In another exemplary embodiment thrust nut 13 may be rotated and pusher plate 11 may engage the bottom of bottle 15 forcing it to press against the inner surface of cap 7. As thrust nut 13 is rotated pressure may increase between pusher plate 11 and cap 7 which may incrementally axially collapse bottle 15. The user may pull handle 8 to counter knob 14 and stops 4 may prevent cap 7 from rotating relative to barrel 1, thus keeping cap 7 firmly attached to barrel 1 during use.

Figure 9:
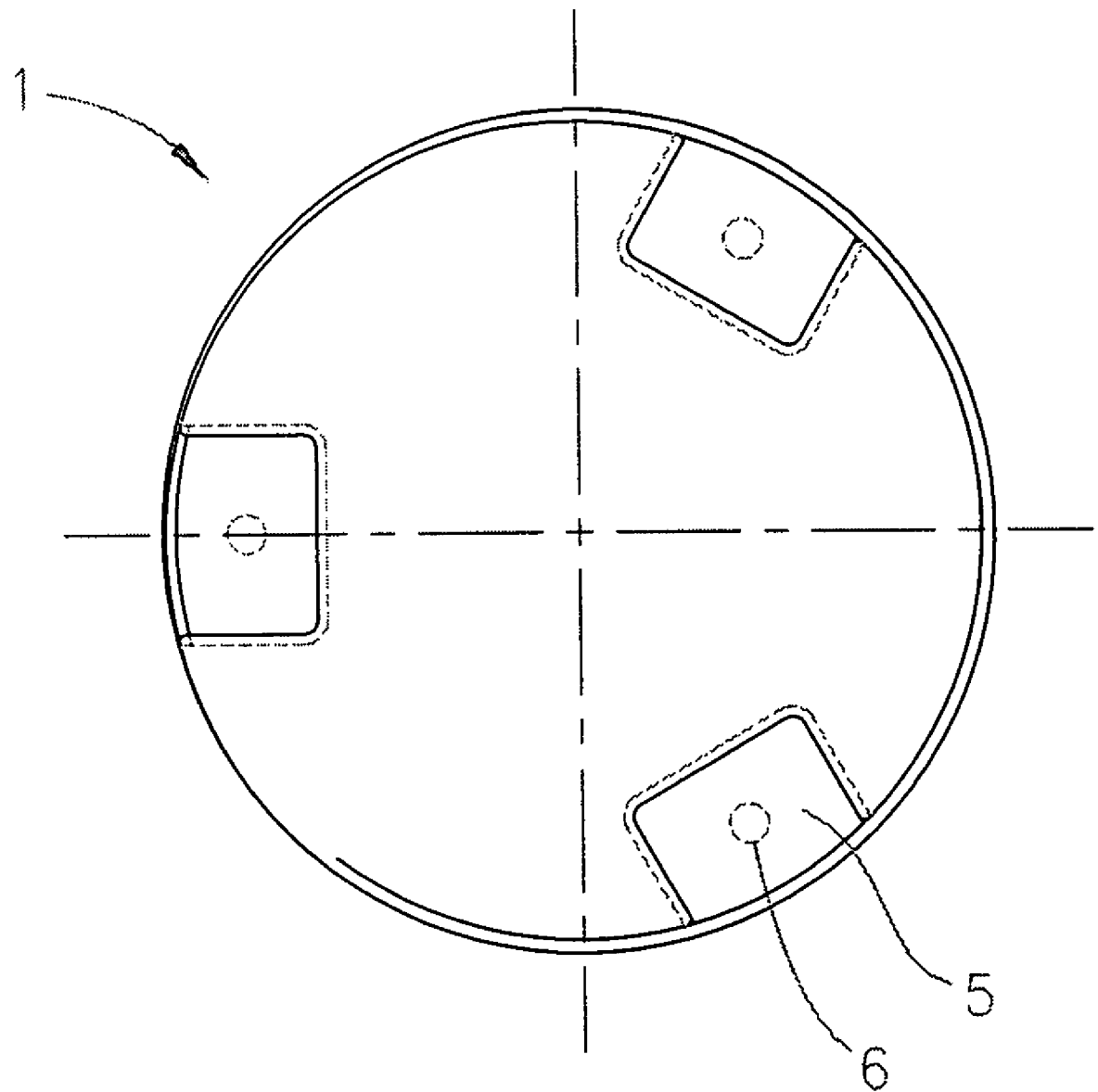
FIG. 9 is an exemplary bottom view of an exemplary embodiment of a barrel of an exemplary embodiment of a bottle crushing apparatus.

As shown in FIGS. 3 and 9, barrel 1 may include feet 5 on the bottom surface thereof. The feet may be made of rubber, other potentially friction increasing material or any other desired material. Barrel 1 may include three feet 5, as seen in FIG. 3, or any other desired number of feet 5. Feet 5 may be slidably attached to barrel 1 through the use of nubs 6 on feet 5 that can engage detents in barrel 1 to hold feet 5 in place. Feet 5 may also be attached to barrel 1 by any other desired attachment mechanism.

Figure 6:
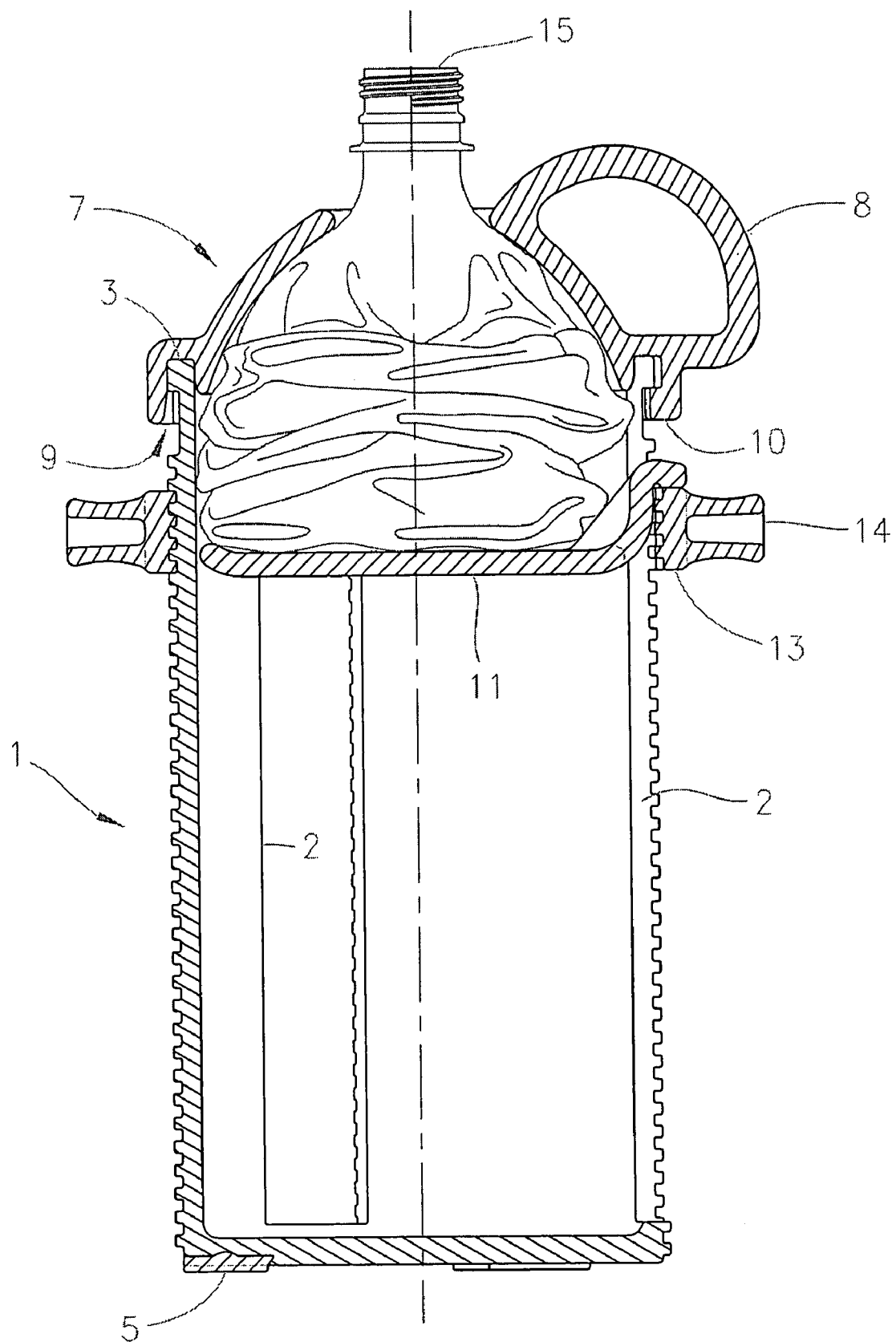
FIG. 6 is an exemplary cross-sectional view of an exemplary embodiment of a bottle crushing apparatus drawn at line B-B of FIG. 3, with a crushed bottle.

A standard 2-liter bottle may have wall thickness of 0.005" which may provide a combination of pliability and resistance to deformation. As shown in FIG. 6, as bottle 15 collapses the folds in bottle 15 may be compact and shallow, for example about 1" deep, creating a desired xylophone pattern.

In an exemplary embodiment, as bottle 15 collapses, the remaining liquid therein may steadily rise up to the neck of bottle 15. Once liquid reaches the top of bottle 15, the user may seal the lid of bottle 13, whereby securing a desired $CO_2$ equilibrium within bottle 15. The user may then continue to rotate thrust nut 13 to apply residual pressure to bottle 15 such that bottle 15 may feel firm to the touch. This process may "pop out" any residual indentations in bottle 15 that could eventually be "popped out" by CO2 pressure, which may ultimately result in a $CO_2$ pocket that can be exhausted upon the next opening of the lid of bottle 15. A solid column of liquid or beverage, with minimal gas, may remain as such until the next pour.

The user may rotate thrust nut 13, for example counter-clockwise, as a means of reducing the pressure on bottle 15 before a subsequent pour. This may aide in preventing liquid from overflowing when the lid of bottle 15 is removed. The user may then repeat this process as described. An exemplary embodiment of a bottle crusher may crush bottle 15 until, for example, only one serving, glass full or any other desired amount of liquid or beverage is left in bottle 15. This process may preserve the desired level of carbonation present in the liquid or beverage until all the liquid is poured out of bottle 15.

When the contents of bottle 15 is removed, as shown in FIG. 6, cap 7 may be rotated clockwise until cap tabs 10 are aligned with channels 2, releasing cap tabs 10 from collar 3.

Cap 7 can then be removed and bottle 15 may be subsequently removed and discarded. Bottle 15 in its crushed state may provide for more efficient disposal in a wastebasket or recycling bin.

The foregoing description and accompanying drawings illustrate the principles, preferred embodiments and modes of operation of the exemplary bottle crushing device. However, the bottle crushing device should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the exemplary bottle crushing device as defined by the following claims.

What is claimed is:

1. A bottle crushing apparatus comprising:
    a barrel for surrounding a bottle, the barrel including:
        a main body wherein an outer surface of the main body includes threads;
        a plate slidably engaged with an inner surface of the barrel at a first end of the barrel;
        a nut operably engaged with the threads, at least one knob attached to the nut;
        at least one tab portion integral with the plate and the at least one tab portion extends through the main body to engage a top surface of the nut; and
        a cap removably attached to an end of the barrel opposite the first end, the cap includes an opening, wherein movement of the nut facilitate movement of the plate in a direction of the cap to crush the bottle against the cap.

2. The bottle crushing apparatus of claim 1, wherein the opening receives a portion of a bottle.

3. The bottle crushing apparatus of claim 1, wherein the threads run more than half the length of the main body of the barrel.

4. The bottle crushing apparatus of claim 1, wherein the barrel further includes:
    at least one channel along the length of the barrel for receiving the tab portion.

5. The bottle crushing apparatus of claim 4, wherein the at least on tab includes three tabs; and the at least one channel includes three channels; each of the three tabs are received by one of the three channels, respectively.

6. The bottle crushing apparatus of claim 1, wherein the cap is rotatably attached to the barrel and includes a handle.

7. A bottle crushing system comprising:
    a bottle made of a malleable material including:
        an opening; and
        a lid repeatably sealable to the opening;
    a barrel for surrounding the bottle, the barrel including:
        a main body wherein an outer surface of the main body includes threads;
        a plate slidably engaged with an inner surface of the barrel at a first end of the barrel;
        a nut operably engaged with the threads, at least one knob attached to the nut;
        at least one tab portion integral with the plate and the at least one tab portion extends through the main body to engage a top surface of the nut; and
        a cap removably attached to an end of the barrel opposite the first end, the cap includes an opening, wherein movement of the nut facilitate movement of the plate in a direction of the cap to crush the bottle against the cap.

8. The bottle crushing system of claim 7, wherein the opening receives a portion of the bottle.

9. The bottle crushing system of claim 8, wherein the portion of the bottle is the opening of the bottle.

10. The bottle crushing system of claim 7, wherein the threads run more than half the length of the main body of the barrel.

11. The bottle crushing system of claim 7, wherein the barrel further includes:
    at least one channel along the length of the barrel for receiving the tab portion.

12. The bottle crushing system of claim 11, wherein the at least one tab includes three tabs; and the at least one channel includes three channels; each of the three tabs are received by one of the three channels, respectively.

13. The bottle crushing system of claim 11, wherein the cap is rotatably attached to the barrel and includes a handle.

* * * * *